(12) United States Patent
DeRoller (10) Patent No.: US 9,276,991 B2
(45) Date of Patent: Mar. 1, 2016

(54) METHOD AND APPARATUS FOR PROVIDING A DYNAMIC TOOL MENU BASED UPON A DOCUMENT

(71) Applicant: Xerox Corporation, Norwalk, CT (US)

(72) Inventor: Matthew H. DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 198 days.

(21) Appl. No.: 14/030,762

(22) Filed: Sep. 18, 2013

(65) Prior Publication Data
US 2015/0082381 A1   Mar. 19, 2015

(51) Int. Cl.
*G06F 3/0482* (2013.01)
*G06F 17/24* (2006.01)
*H04L 29/08* (2006.01)
*H04L 12/26* (2006.01)
*H04W 12/08* (2009.01)
*H04L 29/14* (2006.01)

(52) U.S. Cl.
CPC .............. *H04L 67/02* (2013.01); *G06F 3/0482* (2013.01); *G06F 17/243* (2013.01); *H04L 43/08* (2013.01); *H04L 67/1029* (2013.01); *H04L 69/40* (2013.01); *H04W 12/08* (2013.01)

(58) Field of Classification Search
CPC ..... G06F 17/243; G06F 3/0482; H04L 67/02; H04L 43/08; H04L 67/1029; H04L 69/40; H04W 12/08

See application file for complete search history.

(56) References Cited

U.S. PATENT DOCUMENTS

| | | | | |
|---|---|---|---|---|
| 6,112,215 A * | 8/2000 | Kaply | ............................ | 715/209 |
| 6,910,179 B1 * | 6/2005 | Pennell et al. | ................. | 715/207 |
| 7,062,532 B1 * | 6/2006 | Sweat et al. | ................... | 709/205 |
| 8,214,362 B1 * | 7/2012 | Djabarov | ....................... | 707/736 |
| 8,355,966 B1 * | 1/2013 | Vu et al. | .......................... | 705/30 |
| 2006/0179404 A1 * | 8/2006 | Yolleck et al. | ................ | 715/507 |
| 2006/0218506 A1 * | 9/2006 | Srenger et al. | ................ | 715/810 |
| 2008/0313529 A1 * | 12/2008 | Gwozdz et al. | ............... | 715/224 |
| 2012/0136756 A1 * | 5/2012 | Jitkoff et al. | .................. | 705/27.1 |
| 2014/0123057 A1 * | 5/2014 | Eigner | .................... | H04L 67/30 715/780 |
| 2014/0372867 A1 * | 12/2014 | Tidhar | .................. | G06F 17/243 7/234 |

* cited by examiner

*Primary Examiner* — Aaron Lowenberger (57) ABSTRACT

A method, non-transitory computer readable medium, and apparatus for providing a tool menu based upon a document displayed on an endpoint device are disclosed. For example, the method opens the document requested by a user in the endpoint device, detects one or more portions of the document that require data entry, determines a type of data entry that is required for the one or more portions of the document that are detected to require data entry, detects one or more configuration settings of the endpoint device and displays one or more tools selected from a plurality of tools on the tool menu based upon the type of data entry that is required for the one or more portions of the document and the one or more configuration settings of the endpoint device.

16 Claims, 5 Drawing Sheets

METHOD AND APPARATUS FOR PROVIDING A DYNAMIC TOOL MENU BASED UPON A DOCUMENT

The present disclosure relates generally to menus and graphical user interfaces presented on an endpoint device and, more particularly, to a method and an apparatus for providing a dynamic tool menu based upon a document.

BACKGROUND

Data entry on documents can be a tedious and repetitive process. Data entry may be even more tedious on touch screen devices that require a user to enter data without a physical keyboard. For example, the user must touch each data entry box in a document and then a keyboard may appear on the screen, in which a user typically must "hunt and peck" type from the keyboard to enter information.

In addition, many programs may have large toolbars that include various options for a particular program. However, many of the options may not be useful or available. In previous technologies, the unavailable options are simply grayed out. However, by still displaying the grayed out options, the toolbar uses valuable screen space in smaller touch screen devices, such as tablets and touch screen laptops.

SUMMARY

According to aspects illustrated herein, there are provided a method, a non-transitory computer readable medium, and an apparatus for providing a tool menu based upon a document displayed on an endpoint device. One disclosed feature of the embodiments is a method that opens the document requested by a user in the endpoint device, detects one or more portions of the document that require data entry, determines a type of data entry that is required for the one or more portions of the document that are detected to require data entry, detects one or more configuration settings of the endpoint device and displays one or more tools selected from a plurality of tools on the tool menu based upon the type of data entry that is required for the one or more portions of the document and the one or more configuration settings of the endpoint device.

Another disclosed feature of the embodiments is a non-transitory computer-readable medium having stored thereon a plurality of instructions, the plurality of instructions including instructions which, when executed by a processor, cause the processor to perform operations that open the document requested by a user in the endpoint device, detect one or more portions of the document that require data entry, determine a type of data entry that is required for the one or more portions of the document that are detected to require data entry, detect one or more configuration settings of the endpoint device and displays one or more tools selected from a plurality of tools on the tool menu based upon the type of data entry that is required for the one or more portions of the document and the one or more configuration settings of the endpoint device.

Another disclosed feature of the embodiments is an apparatus comprising a processor and a computer readable medium storing a plurality of instructions which, when executed by the processor, cause the processor to perform operations that open the document requested by a user in the endpoint device, detect one or more portions of the document that require data entry, determine a type of data entry that is required for the one or more portions of the document that are detected to require data entry, detect one or more configuration settings of the endpoint device and displays one or more tools selected from a plurality of tools on the tool menu based upon the type of data entry that is required for the one or more portions of the document and the one or more configuration settings of the endpoint device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for a dynamic tool menu based upon a document displayed on an endpoint device. In one embodiment, the tools listed in the menu may change as the documents that are opened in the endpoint device change. For example, the tool menu may include only those tools that can be used for each one of the different documents that is opened. As a result, the dynamic tool menu streamlines the menu options to help the user easily identify available tools for each document and provide more satisfying user experience.

Figure 1:
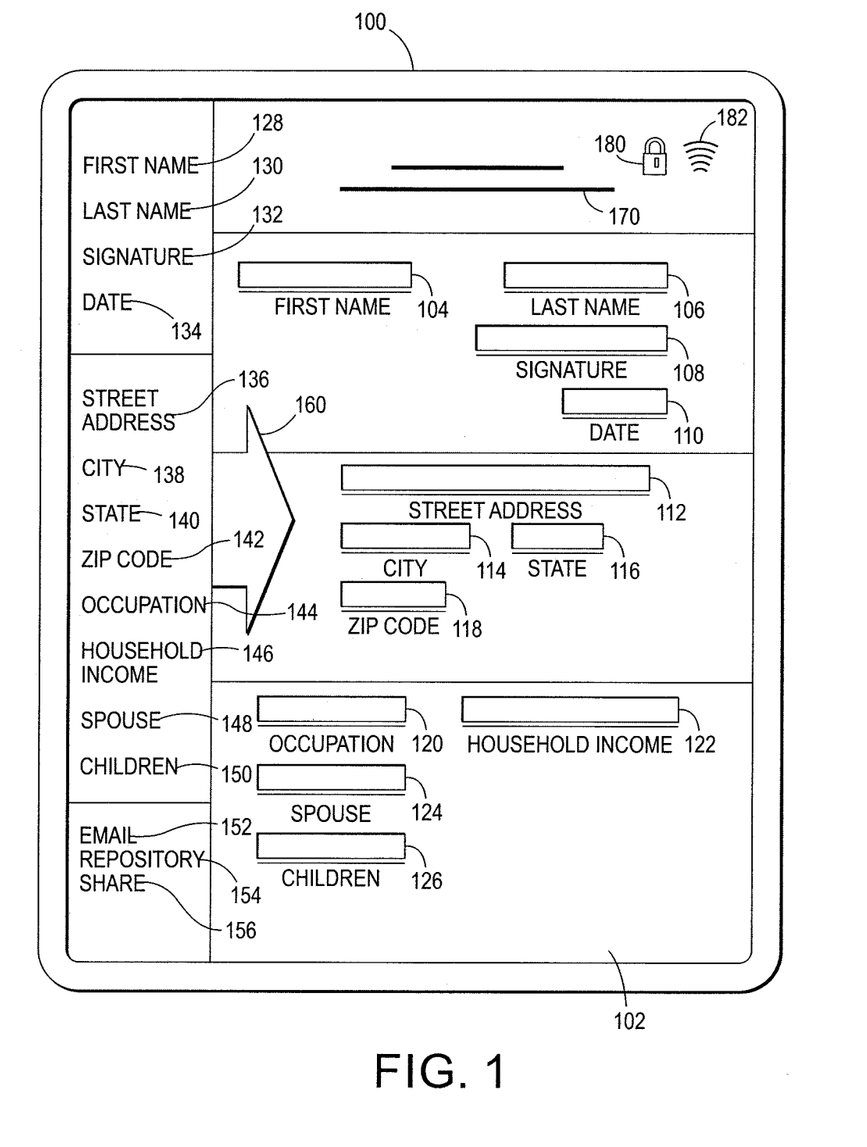
FIG. 1 illustrates an example tool menu displayed when a first document is opened on an endpoint device.

FIG. 1 illustrates a first example of a tool menu 160 displayed when a first document 102 is opened on an endpoint device 100. In one embodiment, the endpoint device 100 may be any electronic device capable of opening documents such as .PDF files, .DOC files, and the like. For example, the endpoint device 100 may be a desktop computer, a laptop computer, a tablet computer, a touch screen computer, a smart phone, and the like.

In one embodiment, the document may include text 170. In addition, the document may include one or more portions 104-126 that require data entry. In one embodiment, the one or more portions 104-126 may be form fields. For example, the one or more portions 104-126 may include fields for a first name 104, a last name 106, a signature 108, a date 110, an address 112, a city 114, a state 116, a zip code 118, an occupation 120, a household income 122, a spouse 124, children 126, and the like.

In one embodiment, the document may be analyzed by a software program such as an image processing library that automatically detects form fields and/or check boxes in the document.

Once the form fields are detected and identified in the document, the tool menu 160 may be modified to include the tools that correspond to each one of the one or more portions 104-126. A tool may be defined as a selectable option that may automate one or more commands associated with the document. For example, the tools may automatically populate data into a field in the document, automatically attach a document to an email, automatically send the document to a central repository that is located remotely from the endpoint device, and the like.

For example, the tool menu 160 includes a first name tool 128, a last name tool 130, a signature tool 132, a date tool 134, a street address tool 136, a city tool 138, a state tool 140, a zip code tool 142, an occupation tool 144, a household income tool 146, a spouse tool 148 and a children tool 150. In one embodiment, a user may simply click on one of the portions 104-126 and then click on the corresponding tool 128-150 and the portion may be automatically filled with the appropriate information. The user may "click" by either using a pointing device to track a pointer on the display or simply use his or her finger for touchscreen devices. In another embodiment, the tools may be dragged and dropped into a respective one of the one or more portions 104-126.

In one embodiment, the tool menu 160 may be hidden from view when not in use. For example, when none of the tools 128-150 are selected, the tool menu 160 may slide back to the left out of view. When the arrow is touched or clicked on the tool menu 160, the tool menu may slide back to the right to display the tools 128-150 that are available. It should be noted that the tool menu 160 may be displayed in other orientations, directions or designs. The example illustrated in FIG. 1 should not be considered limiting with respect to how the tool menu 160 is displayed or hidden from view.

In one embodiment, the information stored in each one of the tools 128-150 may be stored in advanced by a user. For example, a user may provide information in a user setting or user account associated with the user before the document is opened on the endpoint device 100.

In another embodiment, the information stored in each one of the tools 128-150 may be obtained automatically based upon a user providing log-in information on the endpoint device 100. For example, the endpoint device 100 may be deployed in an enterprise setting where multiple users or employees may log on to the endpoint device 100 at different times. The company may have stored all of the necessary information associated with the user in a centralized database accessed by the endpoint device 100. Thus, when the user logs into the endpoint device 100, the endpoint device 100 may retrieve all the necessary information associated with each one of the tools 128-150 automatically.

In one embodiment, the tool menu 160 may also include one or more tools that are associated with a configuration setting of the endpoint device 100 based upon a security level of the user or a wireless communication setting. For example, the endpoint device 100 may include a security icon 180 and a wireless connection icon 182. If the endpoint device 100 has a wireless connection, the wireless connection icon 182 may appear and tools associated with the wireless connection icon 182 may be displayed in the tool menu 160. In addition, if the user has a sufficient security level, then tools associated with the security level may also be displayed in the tool menu 160.

For example, in FIG. 1 the user may have the highest security level and be connected to a wireless connection as indicated by icons 180 and 182, respectively. Thus, the tool menu 160 may include an email tool 152, a repository tool 154 and a share tool 156. For example, the email tool 152 may allow the user to attach the document 102 into an email and email the document 102 externally or internally. The repository tool 154 may allow the user to send the document 102 to be stored to a central repository or document management center of the company that is remotely located from the endpoint device 100. The share tool 156 may allow the user to share the document 102 on a social networking website.

Although FIG. 1 illustrates various examples of tools in the tool menu 160, it should be noted that the examples are not limiting. Other types of tools may be included if they are identified in the document 102 as a form field that requires data entry. In addition, other tools may be included that are associated with various configurations or settings of the endpoint device 100 or a security level of a user.

Figure 2:
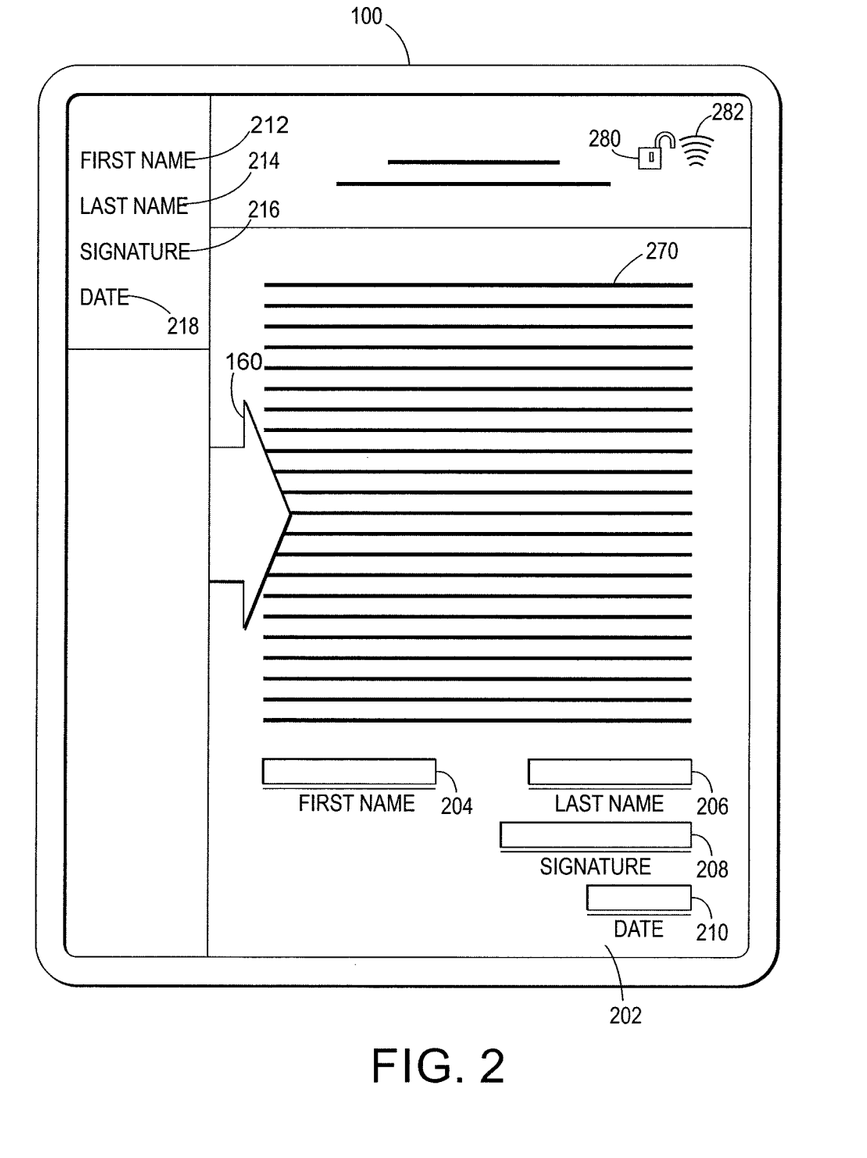
FIG. 2 illustrates an example tool menu displayed when a second document is opened on the endpoint device.

FIG. 2 illustrates an example tool menu 160 when a second document 202 is opened on the endpoint device 100. As discussed above, the tool menu 160 may be dynamic. That is, for different documents 102 and 202, the tool menu 160 may change what tools are displayed in the menu based upon the document 102 or 202. In addition, the tools that are displayed may change based upon a change in security level of the user or the wireless settings.

In FIG. 2, the document 202 may include text 270. In addition, the document 202 may include one or more portions 204-210 that require data entry. For example, the portions 204-210 may include fields for a first name 204, a last name 206, a signature 208 and a date 210.

Furthermore, a different user other than the user in FIG. 1 may be logged on to the endpoint device 100. The different user in FIG. 2 may have a lower security level that does not allow for connection to an external network or any wireless connectivity on the endpoint device 100 as illustrated by the no security icon 280 and the no wireless connection icon 282. Alternatively, the endpoint device 100 may be moved to a location where no wireless connectivity is available.

As a result, the tool menu 160 may only include a first name tool 212, a last name tool 214, a signature tool 216 and a date tool 218. Notably, tools displayed in the menu 160 have changed from FIG. 1 even though it is opened by the same software program on the endpoint device 100. Notably, the only change was that a different document 202 was opened in FIG. 2. Thus, the present disclosure provides a streamlined tool menu 160 that does not display tools that cannot be used for a particular document such that a user can quickly identify which tools should be used for the particular document.

Figure 3:
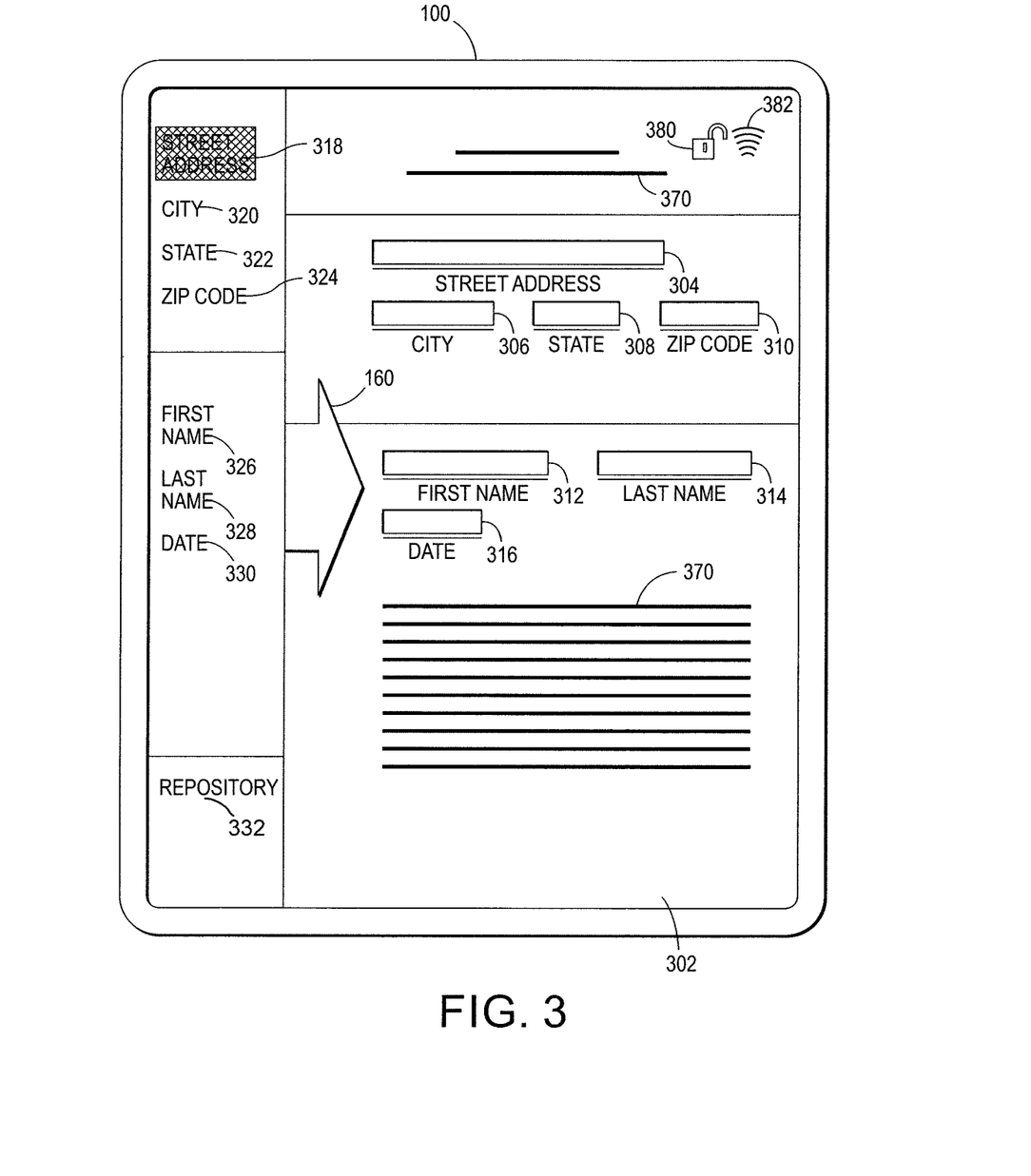
FIG. 3 illustrates an example tool menu displayed when a third document is opened on the endpoint device.

FIG. 3 illustrates an example tool menu 160 displayed when a third document 302 is opened on the endpoint device 100. In one embodiment, the tool menu 160 may also be used to track progress of the document 302. For example, one or more tools 318-330 may be displayed in the tool menu 160 in an order that one or more portions 304-316 of the document 302 that require data entry appear in the document 302. As the tools 318-330 are used for each one of the one or more portions 304-316, each tool that is used may be removed from the tool menu 160 or grayed out.

For example, the document 302 may include text 370 and the one or more portions 304-316 that require data entry. The one or more portions 304-316 may include fields for a street address 304, a city 306, a state 308, a zip code 310, a first name 312, a last name 314 and a date 316. In addition, a third different user may be logged in the endpoint device 100. The third different user may have an intermediate security level that allows a wireless connection internally as illustrated by icons 380 and 382, respectively.

Thus, the tool menu include a street address tool 318, a city tool 320, a state tool 322, a zip code tool 324, a first name tool 326, a last name tool 328 and a date tool 330 that correspond to each one of the one or more portions 304-316 of the document 302. In addition, the tool menu 160 may only include a repository tool 332. Thus, the user may use the wireless connection on the endpoint device 100 to send the document 302 to an internally located centralized repository to be stored. However, unlike the user in FIG. 1, the user may not have available tools for emailing or sharing the document 302 externally.

As illustrated in FIG. 3, when a user selects the street address tool 318 to enter data into the street address field 304, the street address tool 318 may be grayed out or removed from the tool menu 160 so that it is no longer displayed. As each tool in the tool menu 160 is used by the user, each tool may be removed or grayed out one by one so the user can easily see what portions remain and have not been addressed in the document 302. In one embodiment, if one of the one or more portions 304-316 are deleted, the corresponding tool may reappear in the tool menu 160 or be colored back in thereby indicating that the corresponding tool can be selected again.

Thus, FIGS. 1-3 illustrate how the tool menu 160 is dynamic and may change as the document that is displayed changes. In addition, FIG. 3 illustrates how the tool menu 160 may be used to track a progress of the user as the user traverses a document displayed on the endpoint device 100.

Figure 4:
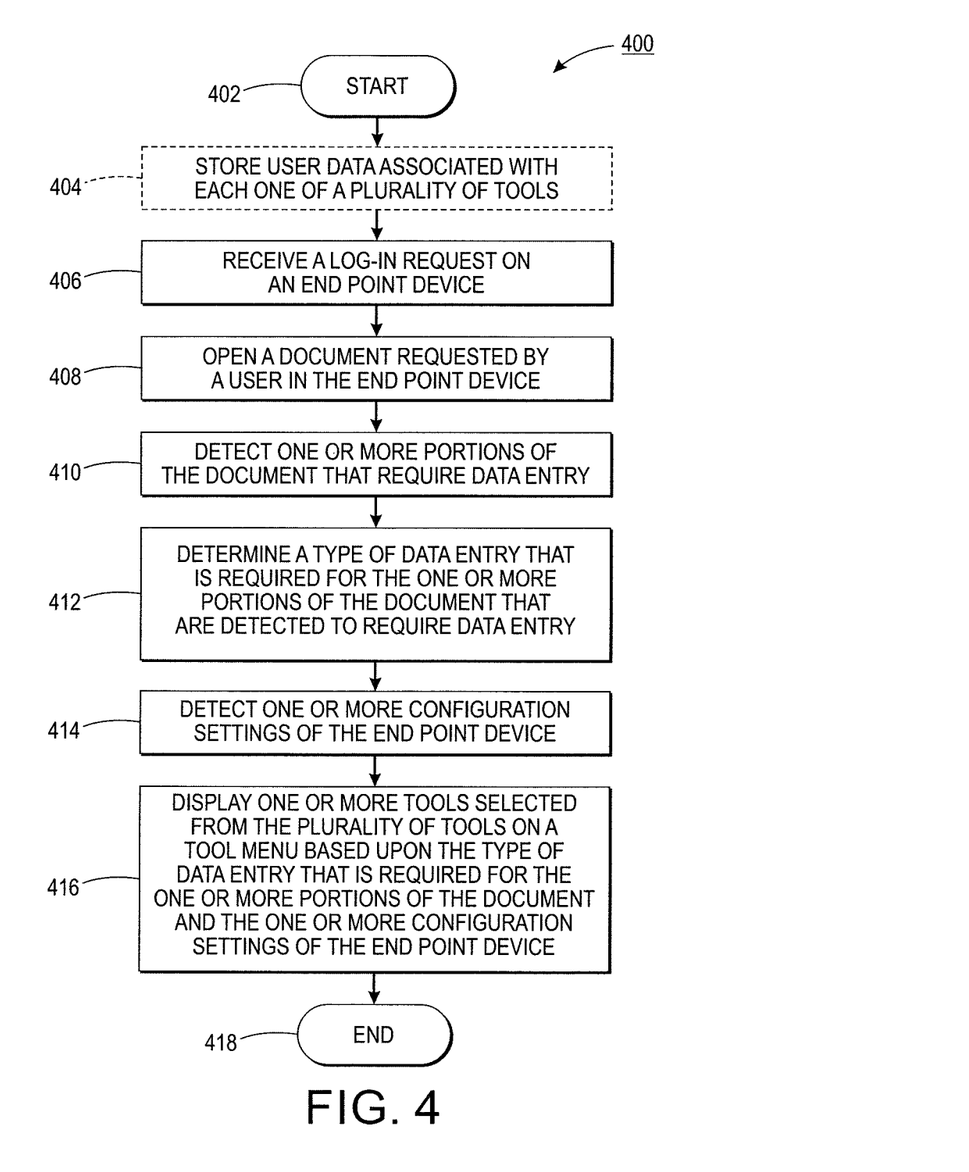
FIG. 4 illustrates an example flowchart of a method for providing a tool menu based upon a document displayed on an endpoint device.
Figure 5:
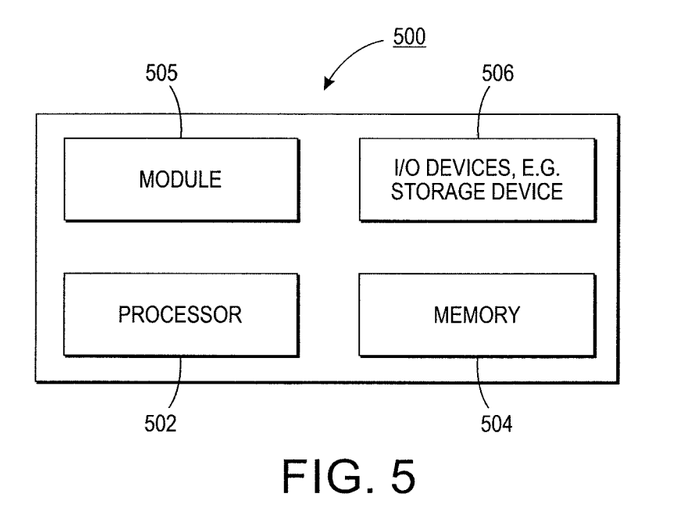
FIG. 5 illustrates a high-level block diagram of a general-purpose computer suitable for use in performing the functions described herein.

FIG. 4 illustrates a flowchart of a method 400 for providing a tool menu based upon a document displayed on an endpoint device. In one embodiment, one or more steps or operations of the method 400 may be performed by the endpoint device or a general-purpose computer as illustrated in FIG. 5 and discussed below.

The method 400 begins at step 402. At optional step 404, the method 400 may store user data associated with each one of a plurality of tools. For example, the user data may be entered manually by a user in the user settings or the user data may be obtained automatically based upon log in information associated with the user, as described above.

At step 406, the method 400 receives a log-in request on an endpoint device. For example, the log-in request may determine a configuration setting of the endpoint device based upon a security level of the user. For example, the log-in request may determine whether a wireless connection should be established, whether the wireless connection should allow communications external to a company's internal network, what documents can be accessed, and the like.

At step 408, the method opens a document requested by a user in the endpoint device. For example, the user may want to access a document and review the document on the endpoint device.

At step 410, the method 400 detects one or more portions of the document that require data entry. For example, the document may be analyzed to determine form fields that may exist in the document that require data entry.

At step 412, the method 400 determines a type of data entry that is required for the one or more portions of the document that are detected to required data entry. For example, the method 400 may identify the form fields in the document as being a last name, a first name, an address, a signature, and the like, such that the method 400 may then determine which information needs to be obtained and which tools need to be displayed in the tool menu for the document that is opened.

At step 414, the method 400 detects one or more configuration settings of the endpoint device. For example, based upon a user's log in credentials, the endpoint device may configure itself to have a wireless connection and configure itself to communicate internally via the wireless connection or also externally via the wireless connection. The endpoint device may also configure itself to determine which databases or servers within a company the endpoint device should connect to or have access to.

At step 416, the method 400 displays one or more tools selected from the plurality of tools on a tool menu based upon the type of data entry that is required for the one or more portions of the document and the one or more configuration settings of the endpoint device. For example, there may be a tool associated for each one of the one or more portions that are identified in the document. Said another way, there is a one-to-one correspondence between the tools displayed in the tool menu and the one or more portions that are identified in the document.

In addition, the tool menu may be dynamic in that the tools displayed in the tool menu may change depending on the document. For example, if a second different document is opened, the tools displayed in the tool menu may be a different set of tools than what was displayed in the tool menu for the first document. The method 400 then proceeds to step 418 where the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a tool menu based upon a document displayed on an endpoint device, and various input/output devices 506 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for providing a tool menu based upon a document displayed on an endpoint device can be loaded into memory 504 and executed by processor 502 to implement the functions as discussed above. As such, the present method 505 for providing a tool menu based upon a document displayed on an endpoint device (including associated data structures) of the present disclosure can be stored on a non-transitory (e.g., physical and tangible) computer readable storage medium, e.g., RAM memory, magnetic or optical drive or diskette and the like. For example, the hardware processor 502 can be programmed or configured with instructions (e.g., computer readable instructions) to perform the steps, functions, or operations of method 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for providing a tool menu based upon a document displayed on an endpoint device, comprising:
   opening, by a processor, the document requested by a user in the endpoint device, wherein the document comprises a .pdf file or a .doc file;
   detecting, by the processor, a plurality of form fields of the document that require data entry;
   determining, by the processor, a type of data entry that is required for each one of the plurality of form fields of the document that are detected to require data entry;
   detecting, by the processor, one or more configuration settings of the endpoint device;
   displaying, by the processor, one or more tools selected from a plurality of tools on the tool menu based upon the type of data entry that is required for the plurality of form fields of the document and the one or more configuration settings of the endpoint device, wherein each form field of the plurality of form fields corresponds to one of the one or more tools that are displayed; and
   removing from display, by the processor, each one of the one or more tools displayed in the tool menu as the each one of the one or more tools is selected to fill in a corresponding form field of the plurality of form fields to track a completion progress of the document.

2. The method of claim 1, further comprising:
   storing, by the processor, in a user setting file user data associated with each one of the plurality of tools, wherein the user data is entered by the user before the document is opened on the endpoint device or obtained from a log-in request from the user of the endpoint device.

3. The method of claim 1, wherein the one or more configuration settings of the endpoint device comprise a security level based upon the user or a wireless communication setting.

4. The method of claim 3, wherein the one or more tools selected from a plurality of tools comprise tools that require access to wireless communications and within the security level based upon the user.

5. The method of claim 4, wherein the tools that require access to wireless communications comprise at least one of: sending the document as an attachment in an email, sharing the document on a social network website, sending the document to a remote repository or sharing the document in an online meeting.

6. The method of claim 1, further comprising:
   opening, by the processor, a second document in the endpoint device;
   detecting, by the processor, a second plurality of form fields of the second document that require data entry;
   determining, by the processor, a type of data entry that is required for the second plurality of form fields of the second document that are detected to require data entry; and
   displaying, by the processor, a second one or more tools selected from the plurality of tools on the tool menu based upon the type of data entry that is required for the second plurality of form fields of the second document and the one or more configuration settings of the endpoint device, wherein the second one or more tools are different than the one or more tools.

7. The method of claim 1, further comprising:
   detecting, by the processor, a change in the one or more configuration settings of the endpoint device; and
   removing, by the processor, tools of the one or more tools based upon the change in the one or more configuration settings.

8. A non-transitory computer-readable medium storing a plurality of instructions, which when executed by a processor, cause the processor to perform operations for providing a tool menu based upon a document displayed on an endpoint device, the operations comprising:
   opening the document requested by a user in the endpoint device, wherein the document comprises a .pdf file or a .doc file;
   detecting a plurality of form fields of the document that require data entry;
   determining a type of data entry that is required for each one of the plurality of form fields of the document that are detected to require data entry;
   detecting one or more configuration settings of the endpoint device;
   displaying one or more tools selected from a plurality of tools on the tool menu based upon the type of data entry that is required for the plurality of form fields of the document and the one or more configuration settings of the endpoint device, wherein each form field of the plurality of form fields corresponds to one of the one or more tools that are displayed; and
   removing from display each one of the one or more tools displayed in the tool menu as the each one of the one or more tools is selected to fill in a corresponding form field of the plurality of form fields to track a completion progress of the document.

9. The non-transitory computer-readable medium of claim 8, further comprising:
   storing in a user setting file user data associated with each one of the plurality of tools, wherein the user data is entered by a user before the document is opened on the endpoint device or obtained from a log-in request from the user of the endpoint device.

10. The non-transitory computer-readable medium of claim 8, wherein the one or more configuration settings of the endpoint device comprise a security level based upon a user or a wireless communication setting.

11. The non-transitory computer-readable medium of claim 10, wherein the one or more tools selected from a plurality of tools comprise tools that require access to wireless communications and within the security level based upon the user.

12. The non-transitory computer-readable medium of claim 11, wherein the tools that require access to wireless communications comprise at least one of: sending the document as an attachment in an email, sharing the document on a social network website, sending the document to a remote repository or sharing the document in an online meeting.

13. The non-transitory computer-readable medium of claim 8, further comprising:
   opening a second document in the endpoint device;
   detecting a second plurality of form fields of the second document that require data entry;
   determining a type of data entry that is required for the second plurality of form fields of the second document that are detected to require data entry; and
   displaying a second one or more tools selected from the plurality of tools on the tool menu based upon the type of data entry that is required for the second plurality of form fields of the second document and the one or more configuration settings of the endpoint device, wherein the second one or more tools are different than the one or more tools.

14. The non-transitory computer-readable medium of claim 8, further comprising:
- detecting a change in the one or more configuration settings of the endpoint device; and
- removing tools of the one or more tools based upon the change in the one or more configuration settings.

15. A method for providing a tool menu based upon a document displayed on an endpoint device, comprising:
- opening, by a processor, the document requested by a user in the endpoint device, wherein the document comprises a .pdf file or a .doc file;
- detecting, by the processor, a plurality of form fields of the document that require data entry;
- determining, by the processor, a type of data entry that is required for each one of the plurality of form fields of the document that are detected to require data entry;
- detecting, by the processor, a security level associated with the user of the endpoint device and whether the endpoint device has a wireless connection;
- displaying, by the processor, tools selected from a plurality of tools on the tool menu that are needed to complete all of the plurality of form fields and share the document based upon the security level and the wireless connection, wherein each form field of the plurality of form fields corresponds to one of the one or more tools that are displayed, wherein the tools selected are different for each different document that is opened on the endpoint device and each different user that logs in to the endpoint device; and
- removing from display, by the processor, each one of the tools selected and displayed in the tool menu as the each one of the tools selected is selected to fill in a corresponding form field of the plurality of form fields of the document to track a completion progress of the document.

16. The method of claim 15, further comprising:
- storing, by the processor, in a user setting file user data associated with each one of the plurality of tools, wherein the user data is entered by the user before the document is opened on the endpoint device.

\* \* \* \* \*